United States Patent
Uchiyama

(10) Patent No.: US 11,560,459 B2
(45) Date of Patent: Jan. 24, 2023

(54) FOAM MOLDING MASTERBATCH, AND MOLDED FOAM ARTICLE

(71) Applicant: SEKISUI CHEMICAL CO., LTD., Osaka (JP)

(72) Inventor: Yusaku Uchiyama, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 279 days.

(21) Appl. No.: 16/651,473

(22) PCT Filed: Sep. 28, 2018

(86) PCT No.: PCT/JP2018/036332
§ 371 (c)(1),
(2) Date: Mar. 27, 2020

(87) PCT Pub. No.: WO2019/073824
PCT Pub. Date: Apr. 18, 2019

(65) Prior Publication Data
US 2020/0262996 A1 Aug. 20, 2020

(30) Foreign Application Priority Data
Oct. 13, 2017 (JP) .............................. JP2017-199417

(51) Int. Cl.
| C08J 9/232 | (2006.01) |
| C08L 23/16 | (2006.01) |
| C08J 3/22 | (2006.01) |
| C08J 9/00 | (2006.01) |
| C08L 33/20 | (2006.01) |

(52) U.S. Cl.
CPC ................ *C08J 9/232* (2013.01); *C08J 3/22* (2013.01); *C08J 9/0061* (2013.01); *C08L 23/16* (2013.01); *C08L 33/20* (2013.01); *C08J 2203/22* (2013.01); *C08J 2323/16* (2013.01); *C08J 2333/20* (2013.01); *C08J 2423/16* (2013.01); *C08J 2433/20* (2013.01); *C08L 2203/14* (2013.01); *C08L 2310/00* (2013.01)

(58) Field of Classification Search
CPC ... C08J 9/232; C08J 3/22; C08J 9/0061; C08J 2203/22; C08J 2323/16; C08J 2333/20; C08J 2423/16; C08J 2433/20; C08J 2201/024; C08J 3/226; C08J 9/32; C08L 23/16; C08L 33/20; C08L 2203/14; C08L 2310/00; B01J 13/185
See application file for complete search history.

(56) References Cited

U.S. PATENT DOCUMENTS

| 10,731,020 B2* | 8/2020 | Tayagaki | B29D 35/122 |
| 2004/0136753 A1* | 7/2004 | Kato | G03G 15/0233 |
| | | | 399/176 |
| 2009/0137691 A1 | 5/2009 | Ejiri | |
| 2011/0166242 A1 | 7/2011 | Kawaguchi et al. | |
| 2014/0088211 A1 | 3/2014 | Hayashi et al. | |
| 2014/0378256 A1* | 12/2014 | Tamura | F16G 5/20 |
| | | | 474/265 |
| 2018/0208733 A1 | 7/2018 | Tayagaki et al. | |

FOREIGN PATENT DOCUMENTS

| CN | 101115816 | 1/2008 |
| CN | 103492469 | 1/2014 |
| CN | 104844944 | 8/2015 |
| EP | 2 336 226 | 6/2011 |
| JP | 05-9326 | 1/1993 |
| JP | 05-279524 | 10/1993 |
| JP | 11-343362 | 12/1999 |
| JP | 2000-178372 | 6/2000 |
| JP | 2002-264173 | 9/2002 |
| JP | 2004-091746 | 3/2004 |
| JP | 2005-212377 | 8/2005 |
| JP | 2010-275335 | 12/2010 |
| JP | 2012-92226 | 5/2012 |
| JP | 2012-213615 | 11/2012 |
| WO | 2010/038615 | 4/2010 |
| WO | 2017/014064 | 1/2017 |

OTHER PUBLICATIONS

What is the composition and production of EPDM rubber, By Alanto, 20016.*
Extended European Search report dated Apr. 7, 2021 in European Patent Application No. 18866550.9.
International Search Report dated Jan. 8, 2019 in International (PCT) Patent Application No. PCT/JP2018/036332, with English Translation.
"Processing Aids of Plastic and Rubber", Chemical Industry Press, 1983, pp. 593-594, with concise explanation, 5 pages.

* cited by examiner

*Primary Examiner* — Irina S Zemel
(74) *Attorney, Agent, or Firm* — Wenderoth, Lind & Ponack, L.L.P.

(57) ABSTRACT

The present invention aims to provide a masterbatch for foam molding which can be suitably used in molding involving high shear force or molding requiring low molding temperature and which can provide a foam molded article having a high expansion ratio and good appearance quality. The present invention also aims to provide a foam molded article formed from the masterbatch for foam molding. Provided is a masterbatch for foam molding, containing: a base resin; and a thermally expandable microcapsule, the masterbatch having a true specific gravity of 0.80 g/cm³ or more and a Mooney viscosity ML 1+4 (100° C.) of 20 to 90, the base resin containing an EPDM resin, the masterbatch containing the thermally expandable microcapsule in an amount of 40 to 300 parts by weight relative to 100 parts by weight of the base resin.

7 Claims, No Drawings

FOAM MOLDING MASTERBATCH, AND MOLDED FOAM ARTICLE

TECHNICAL FIELD

The present invention relates to a masterbatch for foam molding which can be suitably used in molding involving high shear force or molding requiring low molding temperature and which can provide a foam molded article having a high expansion ratio and good appearance quality. The present invention also relates to a foam molded article formed from the masterbatch for foam molding.

BACKGROUND ART

Plastic foams can exhibit heat shielding properties, heat insulation properties, sound insulation properties, sound absorption properties, vibration proofing properties, light weight, and the like according to the material of the foam and the state of the formed cells. Plastic foams are thus used in various applications. An exemplary method for producing a plastic foam involves foaming and molding a masterbatch containing a chemical foaming agent under heat. Such a masterbatch containing a chemical foaming agent, however, is difficult to handle because sometimes it fails to foam even under heat, and the foaming agent may rapidly decompose in the injection foam molding device. In addition, such a masterbatch may fail to provide a sufficient expansion ratio depending on the type of the resin, making it difficult for the molded article to have desired hardness.

Patent Literature 1 teaches that an ethylene-α-olefin copolymer masterbatch pellet containing a chemical foaming agent can provide an injection foam molded article having high hardness, a high expansion ratio, and uniformly formed cells, regardless of the type of the resin.

However, chemical foaming agents, when decomposed under heat, produce foam residue as well as decomposition gas. The residue remaining in the molded article may affect the adhesiveness of the molded article. In addition, with the use of the chemical foaming agent, not all the cells are formed as closed cells, and some open cells are inevitably formed, making it difficult to provide a highly airtight foam molded article.

Patent Literature 2 discloses a masterbatch for a foamed resin which contains a polyolefin resin or styrene resin as a base resin and contains a thermally expandable microcapsule as a foaming agent instead of a chemical foaming agent.

Unfortunately, with the thermally expandable microcapsule disclosed in Patent Literature 2, the resulting foam has a low expansion ratio, and it is difficult to adjust the closed cells of the resulting foam to a predetermined size.

Meanwhile, Patent Literature 3 discloses a method for producing a foam complex sheet, including foaming and molding a resin composition obtained by blending a masterbatch containing a thermally expandable microcapsule and a masterbatch containing a chemical foaming agent.

Although such a method improves the expansion ratio to some extent, the molded article still has a low expansion ratio and fails to exhibit desired properties such as light weight and heat insulation properties. In addition, by this method, it is difficult to produce a molded article with good appearance quality.

Patent Literature 4 discloses a synthetic resin composition containing a thermally expandable microcapsule and a base resin, and a method for producing the composition. The literature teaches that the synthetic resin composition contains a base resin having a melt flow rate in a predetermined range, so that the base resin does not break the shell of the thermally expandable microcapsule and has high miscibility or compatibility with the thermally expandable microcapsule.

CITATION LIST

Patent Literature

Patent Literature 1: JP 2000-178372 A
Patent Literature 2: JP H11-343362 A
Patent Literature 3: JP 2005-212377 A
Patent Literature 4: JP 2002-264173 A

SUMMARY OF INVENTION

Technical Problem

The present invention aims to provide a masterbatch for foam molding which can be suitably used in molding involving high shear force or molding requiring low molding temperature and which can provide a foam molded article having a high expansion ratio and good appearance quality. The present invention also aims to provide a foam molded article formed from the masterbatch for foam molding.

Solution to Problem

The present invention relates to a masterbatch for foam molding, containing: a base resin; and a thermally expandable microcapsule, the masterbatch having a true specific gravity of 0.80 $g/cm^3$ or more and a Mooney viscosity ML 1+4 (100° C.) of 20 to 90, the base resin containing an EPDM resin, the masterbatch containing the thermally expandable microcapsule in an amount of 40 to 300 parts by weight relative to 100 parts by weight of the base resin.

The present invention is described in detail below.

The present inventors made intensive studies to find out that a masterbatch can be suitably used in molding involving high shear force or molding requiring low molding temperature when the masterbatch contains an EPDM resin as a base resin and a thermally expandable microcapsule as a foaming component, and the amount of the thermally expandable microcapsule, the amount of the base resin, and the Mooney viscosity are set within predetermined ranges. The inventors also found out that such a masterbatch can provide a foam molded article having a high expansion ratio and good appearance quality. The inventors thus completed the present invention.

The masterbatch for foam molding of the present invention contains a base resin.

In the present invention, an EPDM resin (ethylene-propylene-diene rubber) is used as the base resin. This allows production of a foam molded article having good appearance quality.

The lower limit of the Mooney viscosity ML 1+4 (100° C.) of the EPDM resin is preferably 5 and the upper limit thereof is preferably 70.

When the Mooney viscosity is 5 or more, the masterbatch for foam molding can have improved handleability. When the Mooney viscosity is 70 or less, the masterbatch for foam molding can have improved processability.

The lower limit of the Mooney viscosity is more preferably 10 and the upper limit thereof is more preferably 60.

The Mooney viscosity is measured by the method specified in JIS K6300, and used as an index of viscosity. In "ML 1+4", "M" denotes Mooney, "L" denotes the rotor shape, and "(1+4)" denotes one minute of pre-heating and four minutes of rotating the rotor. The "(100° C.)" means that the Mooney viscosity is measured at 100° C.

The lower limit of the ethylene content of the EPDM resin (percentage by weight of the ethylene component in the entire EPDM resin) is preferably 50% by weight and the upper limit thereof is preferably 72% by weight.

The use of an EPDM resin having an ethylene content within the above range can improve the dispersibility of the thermally expandable microcapsule and the moldability. The lower limit of the ethylene content is more preferably 55% by weight and the upper limit thereof is more preferably 65% by weight.

The propylene content of the EPDM resin (percentage by weight of the propylene component in the entire EPDM resin) is preferably 20 to 50% by weight.

The lower limit of the diene content of the EPDM resin (percentage by weight of the diene component in the entire EPDM resin) is preferably 2.3% by weight and the upper limit thereof is preferably 9.5% by weight.

The use of an EPDM resin having a diene content within the range can improve weather resistance. The lower limit of the diene content is more preferably 4% by weight and the upper limit thereof is more preferably 5.5% by weight.

Examples of the diene component constituting the EPDM resin include norbornenes such as 5-ethylidene-2-norbornene (ENB), 5-methylene-2-norbornene, 5-n-propylidene-2-norbornene, 5-isobutylidene-2-norbornene, and 5-n-butylidene-2-norbornene. Examples also include non-conjugated dienes such as dicyclopentadiene (DCPD), 1,4-hexadiene (HD), and bicyclo[2.2.1]heptadiene. Particularly preferred among them is 5-ethylidene-2-norbornene.

The EPDM resin preferably has a ratio of the ethylene component to the diene component (ethylene component: diene component) of 80:20 to 98:2, more preferably 84:16 to 96:4.

The lower limit of the weight average molecular weight of the EPDM resin is preferably 10,000 and the upper limit thereof is preferably 1,000,000. The EPDM resin may be oil-extended or non-oil-extended.

The EPDM resin may account for 100% by weight of the base resin. Alternatively, in addition to the EPDM resin, one or two or more resin components other than EPDM resin may be appropriately mixed.

In the case of using resin component(s) other than EPDM resin, the proportion of the EPDM resin is preferably 80% by weight or more, more preferably 90% by weight or more.

Examples of the resin component other than EPDM resin include rubber components. Examples of the rubber component include ethylene propylene rubber (EPR), natural rubber (NR), butadiene rubber (BR), styrene butadiene rubber (SBR), isoprene rubber (IR), acrylonitrile-butadiene rubber (NBR), and butyl rubber (IIR). Other examples include chloroprene rubber (CR), acrylic rubber (ACM, ANM), urethane rubber (U), and silicone rubber (Si). One or two or more selected from the rubber components may be used in combination.

A common thermoplastic resin may be used as the resin component other than the EPDM resin.

Examples of the thermoplastic resin include common thermoplastic resins such as polyvinyl chloride, polypropylene, polypropylene oxide, low density polyethylene, high density polyethylene, and polystyrene, and engineering plastics such as polybutylene terephthalate, nylon, polycarbonate, and polyethylene terephthalate. In particular, the thermoplastic resin is preferably at least one selected from the group consisting of low density polyethylene, high density polyethylene, polypropylene, and polystyrene.

In the masterbatch for foam molding of the present invention, the lower limit of the amount of the base resin is preferably 30% by weight and the upper limit thereof is preferably 70% by weight. When the amount of the base resin is less than 30% by weight, foaming may occur during production of the masterbatch, and the masterbatch may not be obtained. When the amount of the base resin is more than 70% by weight, a desired expansion ratio may not be obtained.

The masterbatch for foam molding of the present invention contains a thermally expandable microcapsule.

The lower limit of the amount of the thermally expandable microcapsule in the masterbatch for foam molding of the present invention relative to 100 parts by weight of the base resin is 40 parts by weight and the upper limit thereof is 300 parts by weight. When the amount of the thermally expandable microcapsule is 40 parts by weight or more, a desired expansion ratio can be obtained. When the amount of the thermally expandable microcapsule is 300 parts by weight or less, foaming during production of the masterbatch can be prevented. As a result, the expansion ratio of the foam molded article can be improved. The lower limit of the amount of the thermally expandable microcapsule is preferably 65 parts by weight and the upper limit thereof is preferably 150 parts by weight.

The shell constituting the thermally expandable microcapsule preferably contains a polymer obtained by polymerizing a monomer mixture that contains a polymerizable monomer containing at least one selected from acrylonitrile, methacrylonitrile, and vinylidene chloride.

The addition of the polymerizable monomer can improve the gas barrier properties of the shell.

The lower limit of the amount of the polymerizable monomer in the monomer mixture is preferably 40% by weight and the upper limit thereof is preferably 98% by weight. When the amount of the polymerizable monomer in the monomer mixture is less than 40% by weight, the shell has low gas barrier properties, which may decrease the expansion ratio. When the amount of the polymerizable monomer in the monomer mixture is more than 98% by weight, the heat resistance may not increase. The lower limit of the amount of the polymerizable monomer in the monomer mixture is more preferably 50% by weight and the upper limit thereof is more preferably 97% by weight.

The monomer mixture preferably contains a cross-linkable monomer that has two or more double bonds in the molecule. The cross-linkable monomer functions as a cross-linking agent. When the monomer mixture contains the cross-linkable monomer, the strength of the shell can be enhanced, and the cell wall is less likely to break upon thermal expansion.

Examples of the cross-linkable monomer include monomers having two or more radically polymerizable double bonds. Specific examples thereof include divinylbenzene, ethylene glycol di(meth)acrylate, diethylene glycol di(meth)acrylate, triethylene glycol di(meth)acrylate, propylene glycol di(meth)acrylate, and 1,4-butanediol di(meth)acrylate. Examples also include 1,6-hexanediol di(meth)acrylate, 1,9-nonanediol di(meth)acrylate, di(meth)acrylate of polyethylene glycol having a weight average molecular weight of 200 to 600, glycerol di(meth)acrylate, and trimethylolpropane di(meth)acrylate. Examples also include trimethylolpropane tri(meth)acrylate, ethylene oxide-modified trimethylolpropane tri(meth)acrylate, pentaerythritol tri(meth)acrylate, and triallylformal tri(meth)acrylate. Examples also include pentaerythritol tetra(meth)acrylate, dipentaerythritol hexa(meth)acrylate, and dimethylol-tricyclodecane di(meth)acrylate.

The lower limit of the amount of the cross-linkable monomer in the monomer mixture is preferably 0.0% by weight and the upper limit thereof is preferably 3.0% by weight. When the amount of the cross-linkable monomer is 3.0% by weight or less, the expansion ratio of the thermally expandable microcapsule can be improved. The lower limit of the amount of the cross-linkable monomer is more preferably 0.0% by weight and the upper limit thereof is more preferably 2.0% by weight.

Examples of monomers other than the polymerizable monomer containing at least one selected from acrylonitrile, methacrylonitrile, and vinylidene chloride and the cross-linkable monomer include: unsaturated monocarboxylic acids, unsaturated dicarboxylic acids, and anhydrides thereof; monoesters of unsaturated dicarboxylic acids and derivatives thereof; and (meth)acrylates, vinyl acetate, and derivatives thereof.

Examples of the unsaturated monocarboxylic acid include acrylic acid, methacrylic acid, ethacrylic acid, crotonic acid, and cinnamic acid. Examples of the unsaturated dicarboxylic acid include maleic acid, itaconic acid, fumaric acid, citraconic acid, and chloromaleic acid. Examples of the monoester of the unsaturated dicarboxylic acid include monomethyl maleate, monoethyl maleate, monobutyl maleate, monomethyl fumarate, monoethyl fumarate, monomethyl itaconate, monoethyl itaconate, and monobutyl itaconate. These may be used alone or in combination of two or more thereof.

The monomer composition containing the monomer mixture contains a polymerization initiator to polymerize the monomers. Suitable polymerization initiators include dialkyl peroxides, diacyl peroxides, peroxy esters, peroxydicarbonates, and azo compounds.

Examples of the dialkyl peroxide include methyl ethyl peroxide, di-t-butyl peroxide, isobutyl peroxide, and dicumyl peroxide.

Examples of the diacyl peroxide include benzoyl peroxide, 2,4-dichlorobenzoyl peroxide, and 3,5,5-trimethylhexanoyl peroxide.

Examples of the peroxy ester include t-butyl peroxypivalate, t-hexyl peroxypivalate, t-butyl peroxyneodecanoate, t-hexyl peroxyneodecanoate, 1-cyclohexyl-1-methylethyl peroxyneodecanoate, and 1,1,3,3-tetramethylbutyl peroxyneodecanoate.

Examples of the peroxydicarbonate include bis(4-t-butylcyclohexyl) peroxydicarbonate, di-n-propyl-oxydicarbonate, diisopropyl peroxydicarbonate, di(2-ethylethylperoxy)dicarbonate, and dimethoxybutyl peroxydicarbonate.

Examples of the azo compound include 2,2'-azobisisobutyronitrile, 2,2'-azobis(4-methoxy-2,4-dimethylvaleronitrile), 2,2'-azobis(2,4-dimethylvaleronitrile), and 1,1'-azobis(1-cyclohexanecarbonitrile).

The lower limit of the weight average molecular weight of the polymer constituting the shell is preferably 100,000 and the upper limit thereof is preferably 2,000,000. When the weight average molecular weight is less than 100,000, the shell may have decreased strength. When the weight average molecular weight is more than 2,000,000, the shell may have too high strength, which may decrease the expansion ratio.

The shell may further contain a stabilizer, an ultraviolet absorber, an antioxidant, an antistatic agent, a flame retardant, a silane coupling agent, a colorant, and the like, if necessary.

The thermally expandable microcapsule includes a volatile expansion agent as a core agent encapsulated by the shell.

The volatile expansion agent is a substance that becomes gaseous at a temperature equal to or lower than the softening point of the polymer constituting the shell. The volatile expansion agent is preferably a low-boiling-point organic solvent.

Examples of the volatile expansion agent include low molecular weight hydrocarbons, chlorofluorocarbons, and tetraalkylsilanes.

Examples of the low molecular weight hydrocarbon include ethane, ethylene, propane, propene, n-butane, isobutane, butene, isobutene, n-pentane, isopentane, neopentane, n-hexane, heptane, isooctane, and petroleum ether.

Examples of the chlorofluorocarbon include $CCl_3F$, $CCl_2F_2$, $CClF_3$, and $CClF_2$—$CClF_2$.

Examples of the tetraalkylsilane include tetramethylsilane, trimethylethylsilane, trimethylisopropylsilane, and trimethyl-n-propylsilane.

In particular, isobutane, n-butane, n-pentane, isopentane, n-hexane, isooctane, petroleum ether, and mixtures of these are preferred. These volatile expansion agents may be used alone or in combination of two or more thereof.

The volatile expansion agent may be a pyrolytic compound that is pyrolyzed into a gaseous form by heat.

For the thermally expandable microcapsule, among the above volatile expansion agents, a low-boiling-point hydrocarbon having a carbon number of 5 or less is preferably used. With such a hydrocarbon, the thermally expandable microcapsule can have a high expansion ratio and quickly start foaming.

The volatile expansion agent may be a pyrolytic compound that is pyrolyzed into a gaseous form by heat.

In the masterbatch for foam molding of the present invention, the lower limit of the amount of the volatile expansion agent used as a core agent is preferably 10% by weight and the upper limit thereof is preferably 25% by weight.

The thickness of the shell varies according to the amount of the core agent. Decreasing the amount of the core agent to excessively thicken the shell leads to a decrease in the foamability. Increasing the amount of the core agent leads to a decrease in the strength of the shell. When the amount of the core agent is 10 to 25% by weight, the thermally expandable microcapsule can achieve both prevention of deflation and increase in the foamability.

The lower limit of the maximum foaming temperature (Tmax) of the thermally expandable microcapsule is preferably 100° C. and the upper limit thereof is preferably 180° C. The thermally expandable microcapsule having a maximum foaming temperature lower than 100° C. has low heat resistance, so that it breaks or shrinks in a high temperature range or during molding processing. Such a thermally expandable microcapsule also causes foaming due to shear during production of the masterbatch, preventing stable production of a non-foamed masterbatch. The lower limit of the maximum foaming temperature is more preferably 120° C.

The maximum foaming temperature herein means the temperature at which the diameter of the thermally expandable microcapsule reaches its maximum (maximum displacement) when the diameter of the thermally expandable microcapsule is measured while the thermally expandable microcapsule is heated from room temperature.

The lower limit of the volume average particle size of the thermally expandable microcapsule is preferably 5 μm and the upper limit thereof is preferably 100 μm. When the volume average particle size is less than 5 μm, the cells in the resulting molded articles are too small, so that the molded article may not be light enough. When the volume average particle size is more than 100 μm, the cells of the resulting molded article are too large, which may cause a problem in terms of strength or the like. The lower limit of the volume average particle size is more preferably 10 μm and the upper limit thereof is more preferably 40 μm. The lower limit is still more preferably 12 μm and the upper limit thereof is more preferably 25 μm.

The lower limit of the bulk specific gravity of the thermally expandable microcapsule is preferably 0.40 g/cm$^3$. The thermally expandable microcapsule having a bulk specific gravity of less than 0.40 g/cm$^3$ is more susceptible to shear and thus is more likely to foam, especially when the masterbatch is produced by extrusion molding. As a result, for example, the true specific gravity of the masterbatch is decreased. This makes it impossible to produce a stable masterbatch, so that variation in the expansion ratio easily occurs in the subsequent foam molding performed by injection molding or the like. The lower limit of the bulk specific gravity is preferably 0.42 g/cm$^3$.

The bulk specific gravity means a specific gravity based on the volume of an aggregate of thermally expandable microcapsules in closest packing in a container or the like. The bulk specific gravity can be measured in conformity with JIS K 6721.

An exemplary method for producing the thermally expandable microcapsule includes the steps of: preparing an aqueous medium; and dispersing an oily mixture in the aqueous medium, the oily mixture containing a volatile expansion agent and a monomer composition that contains the above polymerizable monomer in an amount of 40 to 98% by weight, the above cross-linkable monomer in an amount of 0 to 3% by weight, a monomer such as vinyl acetate, and a polymerization initiator; and polymerizing the monomers.

In production of the thermally expandable microcapsule, first, the step of preparing an aqueous medium is performed. Specifically, for example, a polymerization reaction container is charged with water, a dispersion stabilizer, and if necessary an auxiliary stabilizer, to prepare an aqueous dispersion medium containing the dispersion stabilizer. If necessary, alkali metal nitrite, stannous chloride, stannic chloride, potassium dichromate, or the like may be added.

Examples of the dispersion stabilizer include silica, calcium phosphate, magnesium hydroxide, aluminum hydroxide, ferric hydroxide, barium sulfate, calcium sulfate, sodium sulfate, calcium oxalate, calcium carbonate, calcium carbonate, barium carbonate, and magnesium carbonate.

The amount of the dispersion stabilizer added is not limited, and appropriately decided according to the type of the dispersion stabilizer, the particle size of the thermally expandable microcapsule, and the like. The lower limit of the amount of the dispersion stabilizer added is preferably 0.1 parts by weight and the upper limit thereof is preferably 20 parts by weight relative to 100 parts by weight of the monomers.

Examples of the auxiliary stabilizer include condensation products of diethanolamine and aliphatic dicarboxylic acids and condensation products of urea and formaldehyde. Examples also include polyvinylpyrrolidone, polyethylene oxide, polyethyleneimine, tetramethylammonium hydroxide, gelatin, methylcellulose, polyvinyl alcohol, dioctyl sulfosuccinate, sorbitan esters, and emulsifiers.

Examples of the combination of the dispersion stabilizer and the auxiliary stabilizer include, but not limited to, a combination of colloidal silica and a condensation product, a combination of colloidal silica and a water-soluble nitrogen-containing compound, and a combination of magnesium hydroxide or calcium phosphate and an emulsifier. Preferred among them is a combination of colloidal silica and a condensation product.

The condensation product is preferably a condensation product of diethanolamine and an aliphatic dicarboxylic acid, particularly preferably a condensation product of diethanolamine and adipic acid or a condensation product of diethanolamine and itaconic acid.

Examples of the water-soluble nitrogen-containing compound include polyvinylpyrrolidone, polyethyleneimine, polyoxyethylene alkylamine, polydialkylaminoalkyl (meth)acrylate, polydialkylaminoalkyl (meth)acrylamide, polyacrylamide, polycationic acrylamide, polyamine sulfone, and polyallylamine.

Examples of the polydialkylaminoalkyl (meth)acrylate include polydimethylaminoethyl methacrylate and polydimethylaminoethyl acrylate.

Examples of the polydialkylaminoalkyl (meth)acrylamide include polydimethylaminopropyl acrylamide and polydimethylaminopropyl methacrylamide. Preferred among them is polyvinylpyrrolidone.

The amount of the colloidal silica added is appropriately decided according to the particle size of the thermally expandable microcapsule. The lower limit of the amount the colloidal silica added is preferably 1 part by weight and the upper limit thereof is preferably 20 parts by weight relative to 100 parts by weight of the vinyl monomer. The lower limit is more preferably 2 parts by weight and the upper limit is more preferably 10 parts by weight. The amount of the condensation product or the water-soluble nitrogen-containing compound added is also decided according to the particle size of the thermally expandable microcapsule. The lower limit of the amount is preferably 0.05 parts by weight and the upper limit thereof is preferably 2 parts by weight relative to 100 parts by weight of the monomers.

In addition to the dispersion stabilizer and the auxiliary stabilizer, an inorganic salt such as sodium chloride or sodium sulfate may be added. Addition of an inorganic salt allows the thermally expandable microcapsule to have a more uniform particle shape. The amount of the inorganic salt added is usually preferably 0 to 100 parts by weight relative to 100 parts by weight of the monomers.

The aqueous dispersion medium containing the dispersion stabilizer is prepared by adding the dispersion stabilizer and the auxiliary stabilizer to deionized water. The pH of the aqueous phase is appropriately decided according to the type of the dispersion stabilizer and the auxiliary stabilizer to be used. For example, when silica such as colloidal silica is used as the dispersion stabilizer, polymerization is performed in an acidic medium. The aqueous medium is made acidic by adjusting the pH of the system to 3 to 4 by adding an acid such as hydrochloric acid as needed. When magnesium hydroxide or calcium phosphate is used, polymerization is performed in an alkaline medium.

In the method for producing the thermally expandable microcapsule, next, the step of dispersing an oily mixture in the aqueous medium is performed. The oily mixture contains a volatile expansion agent and a monomer composition that contains the above polymerizable monomer in an amount of 40 to 98% by weight, the above cross-linkable monomer in an amount of 0 to 3% by weight, a monomer such as vinyl acetate, and a polymerization initiator. In this step, the monomers and the volatile expansion agent may be separately added to the aqueous dispersion medium to prepare the oily mixture in the aqueous dispersion medium. Typically, however, they are mixed in advance to form the oily mixture, and the obtained oily mixture is added to the aqueous dispersion medium. In this case, the oily mixture and the aqueous dispersion medium may be prepared in separate containers in advance, mixed in another container with stirring to disperse the oily mixture in the aqueous dispersion medium, and then added to the polymerization reaction container.

The polymerization initiator is used to polymerize the monomers. The polymerization initiator may be added to the oily mixture in advance, or may be added after the aqueous dispersion medium and the oily mixture are mixed with stirring in the polymerization reaction container.

The oily mixture may be emulsified to a predetermined particle size in the aqueous dispersion medium by, for example, a method including stirring with a homomixer (e.g., available from Tokushu Kika Kogyo Co., Ltd.), or a method including passing the oily mixture and the aqueous dispersion medium through a static dispersion apparatus such as a line mixer or an element static dispersion machine.

Here, the aqueous dispersion medium and the polymerizable mixture may be separately fed to the static dispersion apparatus, or a dispersion obtained by mixing and stirring in advance may be fed to the dispersion apparatus.

The thermally expandable microcapsule can be produced by performing the step of polymerizing the monomers by, for example, heating the dispersion obtained through the above steps.

The masterbatch for foam molding of the present invention may contain a chemical foaming agent. For example, when the masterbatch contains a chemical foaming agent such as sodium hydrogen carbonate, $CO_2$ produced upon decomposition can improve the foamability. In addition, using a chemical foaming agent in combination with the thermally expandable microcapsule can reduce the formation of open cells, which tends to occur when the chemical foaming agent is used alone.

The chemical foaming agent may be any chemical foaming agent that is powdery at room temperature, and may be a conventional, common chemical foaming agent. Specific examples thereof include inorganic chemical foaming agents such as sodium hydrogen carbonate and organic chemical foaming agents such as azodicarbonamide, N,N'-dinitrosopentamethylenetetramine, P,P'-oxybisbenzenesulfonylhydrazide, and paratoluenesulfonylhydrazide.

The masterbatch for foam molding of the present invention may contain an additive such as a lubricant or a process oil. The lubricant contained in the masterbatch reduces the shear applied to the thermally expandable microcapsule during production of the masterbatch, so that slight foaming is less likely to occur. The lubricant also improves the dispersibility of the thermally expandable microcapsule and makes it easier to produce a masterbatch. As a result, a masterbatch with a high concentration of the thermally expandable microcapsule can be stably produced with good production efficiency.

The lubricant may be any lubricant that dissolves at a temperature in production of the masterbatch, and may be a conventional, common lubricant. Specific examples thereof include polyethylene wax having a viscosity average molecular weight of 3,000 or less, glycerol fatty acid esters such as glycerol monostearate and diglycerol stearate, fatty acids such as stearic acid, and composite lubricants.

The process oil is not limited, and may be a paraffinic process oil, a naphthenic process oil, an aromatic process oil, or a hydrocarbon process oil obtained by mixing them, for example. Preferred among them is a paraffinic process oil.

The amount of the process oil relative to 100 parts by weight of the base resin is preferably 40 to 200 parts by weight.

The masterbatch for foam molding of the present invention may be in any form, such as a powder form, a granular form, a bulk form, a strand form, a pellet form, or a sheet form.

The lower limit of the true specific gravity of the masterbatch for foam molding of the present invention is 0.80 $g/cm^3$. A true specific gravity of less than 0.80 $g/cm^3$ indicates that the thermally expandable microcapsule in the masterbatch is swollen. Thus, with such a true specific gravity, the molded article obtained after molding has a reduced expansion ratio.

The lower limit of the true specific gravity is preferably 0.90 $g/cm^3$ and the upper limit thereof is preferably 1.0 $g/cm^3$.

The true specific gravity means a specific gravity of only the material excluding pores, and indicates the ratio of the mass of a unit volume of the masterbatch at 20° C. to the mass of an equal volume of water at 4° C. The true specific gravity can be measured by a method in conformity with Method A (water displacement method) of JIS K 7112.

The lower limit of the Mooney viscosity ML 1+4 (100° C.) of the masterbatch for foam molding of the present invention is 20 and the upper limit thereof is 90.

With the Mooney viscosity of 20 or higher, adherence or the like between portions of the masterbatch can be prevented, which can improve the handleability. With the Mooney viscosity of 90 or less, the kneadability with the matrix resin can be improved. The lower limit is preferably 40 and the upper limit is preferably 85.

The method for producing the masterbatch for foam molding of the present invention is not limited. In an exemplary method, raw materials such as a base resin containing an EPDM resin having a predetermined Mooney viscosity and additives (e.g., a lubricant) are kneaded with a pressurizing kneader at 50° C. to 100° C. for about five minutes in advance. The kneaded rubber composition is fed to a roll machine, and mixed for five minutes under the molding conditions of a roll temperature of 50° C. to 100° C., a roll speed of 20 rpm, and a distance between rolls of 1 cm to be formed into a sheet form masterbatch having a thickness of 1 cm. In the case where slight foaming occurs at this time, a desired expansion ratio is less likely to be achieved in the subsequent foam molding, and great variation in the expansion ratio occurs.

Other methods that can be used include a method involving kneading raw materials such as the base resin, the thermally expandable microcapsule, and the lubricant with a batch-type kneader and granulating the mixture with a granulator, and a method involving producing a pellet form masterbatch with an extruder and a pelletizer.

The kneader may be any kneader that can knead without breaking the thermally expandable microcapsule. Examples thereof include a Banbury mixer.

A foam molded article can be produced by adding a matrix resin such as a thermoplastic resin to the masterbatch for foam molding of the present invention to prepare a resin composition, and molding the resin composition by a molding method such as injection molding to foam the resin composition with the thermally expandable microcapsule by heating in the molding. Such a foam molded article is also encompassed by the present invention.

The foam molded article of the present invention obtained by such a method has a high expansion ratio and high appearance quality, and contains uniformly formed closed cells. The foam molded article thus is very light and excellent in heat insulation properties, shock resistance, rigidity, and the like, and can be suitably used in applications such as building materials for housing, automobile members, and shoe soles.

The matrix resin (e.g., a thermoplastic resin) is not limited as long as it does not interfere with the purposes of the present invention. For example, the matrix resin may be a common thermoplastic resin such as polyvinyl chloride, polystyrene, polypropylene, polypropylene oxide, or polyethylene. Alternatively, the matrix resin may be an engineering plastic such as polybutylene terephthalate, nylon, polycarbonate, or polyethylene terephthalate. Alternatively, the matrix resin may be a thermoplastic elastomer such as an ethylene thermoplastic elastomer, a vinyl chloride thermoplastic elastomer, an olefin thermoplastic elastomer, a urethane thermoplastic elastomer, or an ester thermoplastic elastomer.

These resins may be used in combination. The matrix resin is preferably the same resin as the base resin.

The amount of the masterbatch for foam molding of the present invention added is preferably 0.5 to 20 parts by weight, more preferably 1 to 10 parts by weight relative to 100 parts by weight of the thermoplastic resin.

The method for producing the foam molded article of the present invention is not limited. Examples thereof include knead molding, calendar molding, extrusion molding, and injection molding. The injection molding may be performed by any method. Examples of the method include a short shot method, in which part of a resin material is placed in a mold and foamed, and a core back method, in which a mold is fully filled with a resin material and then opened enough to achieve a desired foam size.

Applications of the molded article obtained by the method for molding the foam molded article of the present invention include, for example, automotive interior materials such as door trims and instrument panels, and automotive exterior materials such as bumpers. Applications also include building materials such as wood plastics, shoe soles, and artificial corks.

Advantageous Effects of Invention

The present invention can provide a masterbatch for foam molding which can be suitably used in molding involving high shear force or molding requiring low molding temperature and which can provide a foam molded article having a high expansion ratio and good appearance quality. In particular, use of the masterbatch for foam molding of the present invention allows production of a molded article that has a smooth surface without cells or the like formed on the surface. Use of the masterbatch for foam molding of the present invention also provides good dispersibility of the thermally expandable microcapsule, allowing production of a foam molded article having uniform cells.

The present invention also can provide a foam molded article formed from the masterbatch for foam molding.

DESCRIPTION OF EMBODIMENTS

Embodiments of the present invention are more specifically described in the following with reference to, but not limited to, examples.

(Production of Thermally Expandable Microcapsule)

A polymerization reaction container was charged with 300 parts by weight of water, 89 parts by weight of sodium chloride as an adjustor, 0.07 parts by weight of sodium nitrite as a water-soluble polymerization inhibitor, 8 parts by weight of colloidal silica (available from Asahi Denka) as a dispersion stabilizer, and 0.3 parts by weight of polyvinylpyrrolidone (available from BASF), whereby an aqueous dispersion medium was prepared. Subsequently, the aqueous dispersion medium was mixed with an oily mixture containing the polymerizable monomer, volatile expansion agent, and polymerization initiator shown in Table 1 to prepare a dispersion. The total dispersion was 15 kg. The obtained dispersion was stirred and mixed with a homogenizer, fed to a pressure polymerization vessel (20 L) purged with nitrogen, pressurized (0.2 MPa), and reacted at 60° C. for 20 hours to give a reaction product. The obtained reaction product was repeatedly dehydrated and water-washed with a centrifuge, and dried to give thermally expandable microcapsules (Nos. 1 to 3).

Examples 1 to 9 and Comparative Examples 1 to 3

(Production of Masterbatch Pellet)

The base resin, thermally expandable microcapsules, and process oil (available from Idemitsu Kosan Co., Ltd., Diana Process Oil PW-90, paraffinic process oil) shown in Table 2 were kneaded with 5 parts by weight of stearic acid as a lubricant with a pressurizing kneader at 70° C. for five minutes. The kneaded product was mixed with a roll machine at a roll temperature of 60° C., a roll speed of 20 rpm, and a distance between rolls of 1 cm for five minutes, whereby a sheet form masterbatch having a thickness of 1 cm was obtained.

The following EPDMs were used.

EPDM (1): Mooney viscosity [ML 1+4 (100° C.)]: 8, ethylene content: 54% by weight, diene component: ENB, diene content: 7.6% by weight, propylene content: 38.4% by weight EPDM (2): Mooney viscosity [ML 1+4 (100° C.)]: 24, ethylene content: 51% by weight, diene component: ENB, diene content: 8.1% by weight, propylene content: 40.9% by weight EPDM (3): Mooney viscosity [ML 1+4 (100° C.)]: 40, ethylene content: 56% by weight, diene component: ENB, diene content: 4.7% by weight, propylene content: 39.3% by weight EPDM (4): Mooney viscosity [ML 1+4 (100° C.)]: 44, ethylene content: 50% by weight, diene component: DCPD, diene content: 5.0% by weight, propylene content: 45.0% by weight Comparative Example 4

(Production of Masterbatch Pellet)

An amount of 100 parts by weight of the base resin shown in Table 2 was kneaded with 10 parts by weight of a fatty acid ester as a lubricant with a Banbury mixer. When about 100° C. was reached, the obtained thermally expandable microcapsules were added in the amount shown in Table 2, followed by kneading for additional 30 seconds. The kneaded product was extruded and pelletized at the same time, whereby masterbatch pellets were obtained. The LDPE in Table 2 denotes low density polyethylene.

Comparative Example 5

The base resin, thermally expandable microcapsules, and process oil (available from Idemitsu Kosan Co., Ltd., Diana Process Oil PW-90, paraffinic process oil) shown in Table 2 were kneaded with 5 parts by weight of stearic acid as a lubricant with a pressurizing kneader at 120° C. for five minutes. The kneaded product was mixed with a roll machine at a roll temperature of 80° C., a roll speed of 20 rpm, and a distance between rolls of 1 cm for five minutes, whereby a sheet form masterbatch having a thickness of 1 cm was obtained.

The following EPDM was used.

EPDM (1): Mooney viscosity [ML 1+4 (100° C.)]: 8, ethylene content: 54% by weight, diene component: ENB, diene content: 7.6% by weight, propylene content: 38.4% by weight (Production of Foam Molded Article)

An EPDM composition was prepared by mixing 100 parts by weight of an EPDM resin (ethylene content: 63% by weight, diene content: 4.4% by weight), 335 parts by weight of other additives (zinc oxide, stearic acid, carbon black, heavy calcium carbonate, and paraffin oil), 1 part by weight of sulfur, and 4 parts by weight of a vulcanization accelerator. The obtained masterbatch pellets and 100 parts by weight of the EPDM composition prepared were mixed. The mixed pellets were fed to a hopper of an extruder, melted and kneaded, and extrusion molded into a sheet form molded article. The extrusion was performed at a mold temperature of 80° C. The sheet form molded article obtained by extrusion molding was heated in a hot air oven (available from Espec Corp.) at 200° C. for five minutes, whereby a foam molded article was obtained.

Evaluation

The thermally expandable microcapsules (Nos. 1 to 3) and the molded articles obtained in Examples 1 to 9 and Comparative Examples 1 to 5 were evaluated for the following properties. Table 1 and Table 2 show the results. In Comparative Example 2, the masterbatch could not be produced, so that the following evaluations were not performed.

(1) Evaluation of Thermally Expandable Microcapsules (1-1) Volume Average Particle Size The volume average particle size was measured with a particle size distribution analyzer (LA-910, available from HORIBA, Ltd.).

(1-2) Foaming Starting Temperature, Maximum Foaming Temperature, and Maximum Displacement The foaming starting temperature (Ts), maximum displacement (Dmax), and maximum foaming temperature (Tmax) were measured with a thermomechanical analyzer (TMA) (TMA2940, available from TA Instruments). Specifically, 25 µg of a sample was placed in an aluminum container having a diameter of 7 mm and a depth of 1 mm, and heated at a temperature increase rate of 5° C./min from 80° C. to 220° C. with a force of 0.1 N applied from the top. The displacement was measured in the perpendicular direction of a measuring terminal. The temperature at which the displacement began to increase was defined as the foaming starting temperature. The maximum value of the displacement was defined as the maximum displacement. The temperature at which the maximum displacement was obtained was defined as the maximum foaming temperature.

TABLE 1

| | | | | ① | ② | ③ |
|---|---|---|---|---|---|---|
| Thermally expandable microcapsule | Amount (parts by weight) | Polymerizable monomer | Acrylonitrile | 60 | 67 | 67 |
| | | | Methacrylonitrile | 35 | 30 | 30 |
| | | | Dipentaerythritol hexaacrylate | 0.2 | 0.5 | 0.5 |
| | | | Vinyl acetate | 5 | 3 | 3 |
| | | Volatile expansion agent | Isopentane | 20 | 15 | 25 |
| | | | Hexane | 0 | 10 | 0 |
| | | Polymerization initiator | 2,2-Azobisisobutyronitrile | 0.8 | 0.8 | 0.8 |
| | | | 2,2'-Azobis(4-methoxy-2,4-dimethylvaleronitrile) | 0.6 | 0.6 | 0.6 |
| | | Volume average particle size (µm) | | 16 | 23 | 28 |
| | | Foaming starting temperature (Ts) (° C.) | | 128 | 137 | 126 |
| | | Maximum foaming temperature (Tmax) (° C.) | | 157 | 163 | 162 |
| | | Maximum displacement (Dmax) (µm) | | 600 | 600 | 900 |

(2) Evaluation of Masterbatch (2-1) Measurement of True Specific Gravity

The true specific gravity of the masterbatch pellets was measured by a method in conformity with Method A (water displacement method) of JIS K 7112 with a densimeter MD-200S (available from Alfa Mirage, Co., Ltd.).

(2-2) Measurement of Mooney Viscosity

The Mooney viscosity of the obtained masterbatch pellets was measured at 100° C. by a method in conformity with JIS K 6300.

(3) Evaluation of Molded Article (3-1) Density and Expansion Ratio

The density before foaming and the density of the obtained molded article (after foaming) were measured by a method in conformity with Method A (water displacement method) of JIS K 7112.

The expansion ratio was calculated from the density of the molded article before and after foaming.

(3-2) Surface Properties

The surface roughness (Rz) of the molded article surface was measured with a 3D shape form measurement system (available from Keyence Corporation). The surface properties were evaluated according to the following criteria.

○ (Good): The measured Rz value was less than 50 µm.
Δ (Fair): 50 µm≤Rz value≤100 µm
× (Poor): The measured Rz value was more than 100 µm.

(3-3) Dispersibility

A cross section of the obtained molded article was visually observed with an electron microscope. The dispersibility of the thermally expandable microcapsules was evaluated according to the following criteria.

○ (Good): Cell distribution was uniform.
× (Poor): Cell distribution was not uniform.

TABLE 2

| | | Example | | | | | | | | | Comparative Example | | | | |
|---|---|---|---|---|---|---|---|---|---|---|---|---|---|---|---|
| | | (1) | (2) | (3) | (4) | (5) | (6) | (7) | (8) | (9) | (1) | (2) | (3) | (4) | (5) |
| Thermally expandable microcapsule No. | | ① | ① | ① | ① | ② | ② | ③ | ① | ① | ① | ① | ① | ① | ③ |
| Base resin used in masterbatch (parts by weight) | EPDM (1) | 100 | 0 | 0 | 0 | 100 | 0 | 100 | 100 | 100 | 100 | 100 | 100 | 0 | 100 |
| | EPDM (2) | 0 | 100 | 0 | 0 | 0 | 100 | 0 | 0 | 0 | 0 | 0 | 0 | 0 | 0 |
| | EPDM (3) | 0 | 0 | 100 | 0 | 0 | 0 | 0 | 0 | 0 | 0 | 0 | 0 | 0 | 0 |
| | EPDM (4) | 0 | 0 | 0 | 100 | 0 | 0 | 0 | 0 | 0 | 0 | 0 | 0 | 0 | 0 |
| | LDPE | 0 | 0 | 0 | 0 | 0 | 0 | 0 | 0 | 0 | 0 | 0 | 0 | 100 | 0 |
| | Process oil | 100 | 100 | 100 | 100 | 100 | 100 | 100 | 100 | 100 | 100 | 100 | 30 | 0 | 100 |
| Amount of thermally expandable microcapsules in masterbatch relative to 100 parts by weight of base resin (parts by weight) | | 100 | 100 | 100 | 100 | 100 | 100 | 100 | 50 | 200 | 30 | 500 | 100 | 100 | 100 |
| Amount of masterbatch in molded article relative to 100 parts by weight of EPDM resin (parts by weight) | | 5 | 5 | 5 | 5 | 5 | 5 | 5 | 5 | 5 | 5 | 5 | 5 | 5 | 5 |
| Masterbatch evaluation | True specific gravity (g/cm$^3$) | 0.95 | 0.91 | 0.88 | 0.92 | 0.89 | 0.93 | 0.93 | 0.88 | 0.94 | 1.06 | Masterbatch production failed | 0.88 | 0.96 | 0.76 |
| | Mooney viscosity (ML (1 + 4) 100° C.) | 42 | 66 | 73 | 76 | 44 | 69 | 45 | 33 | 55 | 28 | | 98 | — | 46 |
| Molded article evaluation | Density (g/cm$^3$) | 0.83 | 0.84 | 0.82 | 0.82 | 0.88 | 0.86 | 0.81 | 0.93 | 0.72 | 1.01 | | 0.83 | 0.88 | 1.05 |
| | Expansion ratio | 1.33 | 1.31 | 1.34 | 1.34 | 1.25 | 1.28 | 1.36 | 1.18 | 1.53 | 1.09 | | 1.33 | 1.25 | 1.05 |
| | Surface properties | ○ | ○ | ○ | ○ | ○ | ○ | ○ | ○ | ○ | ○ | | Δ | x | Δ |
| | Dispersibility | ○ | ○ | ○ | ○ | ○ | ○ | ○ | ○ | ○ | x | | x | x | x |

INDUSTRIAL APPLICABILITY

The present invention can provide a masterbatch for foam molding which can be suitably used in molding involving high shear force or molding requiring low molding temperature and which can provide a foam molded article having a high expansion ratio and good appearance quality. The present invention also aims to provide a foam molded article formed from the masterbatch for foam molding.

The invention claimed is:

1. A masterbatch for foam molding, comprising:
a base resin; and
a thermally expandable microcapsule,
the masterbatch having a true specific gravity of 0.80 g/cm$^3$ or more and a Mooney viscosity ML 1+4 (100° C.) of 20 to 90,
the base resin containing an EPDM resin,
the masterbatch containing the thermally expandable microcapsule in an amount of 40 to 300 parts by weight relative to 100 parts by weight of the base resin,
wherein the EPDM resin has a diene content of 2.3 to 9.5% by weight.

2. The masterbatch for foam molding according to claim 1, wherein the EPDM resin has an ethylene content of 50 to 72% by weight.

3. The masterbatch for foam molding according to claim 1, wherein the thermally expandable microcapsule includes: a shell containing a polymer; and a volatile expansion agent as a core agent encapsulated by the shell, and the shell contains a polymer obtained by polymerizing a monomer mixture that contains a polymerizable monomer containing at least one selected from acrylonitrile, methacrylonitrile, and vinylidene chloride.

4. The masterbatch for foam molding according to claim 1, wherein the thermally expandable microcapsule has a maximum foaming temperature of 180° C. or lower.

5. A foam molded article formed from the masterbatch for foam molding according to claim 1.

6. The masterbatch for foam molding according to claim 1, wherein the EPDM resin has an propylene content of 20 to 50% by weight.

7. The masterbatch for foam molding according to claim 1, wherein the thermally expandable microcapsule has a bulk specific gravity of 0.42 g/cm$^3$ or more.

* * * * *